(12) United States Patent
Saito

(10) Patent No.: US 8,340,346 B2
(45) Date of Patent: Dec. 25, 2012

(54) INFORMATION PROCESSING DEVICE, INFORMATION PROCESSING METHOD, AND COMPUTER READABLE MEDIUM

(75) Inventor: Kazuo Saito, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 828 days.

(21) Appl. No.: 12/467,588

(22) Filed: May 18, 2009

(65) Prior Publication Data

US 2010/0124355 A1    May 20, 2010

(30) Foreign Application Priority Data

Nov. 20, 2008    (JP) ................................. 2008-296724

(51) Int. Cl.
*G06K 9/00*    (2006.01)
(52) U.S. Cl. ........................................................ 382/100
(58) Field of Classification Search ................... 382/100
See application file for complete search history.

(56) References Cited

U.S. PATENT DOCUMENTS

| | | | |
|---|---|---|---|
| 5,583,941 A | 12/1996 | Yoshida | |
| 7,143,210 B2 * | 11/2006 | Ferlitsch | 710/38 |
| 7,716,490 B2 * | 5/2010 | Kanai | 713/182 |
| 7,840,795 B2 * | 11/2010 | Peterson et al. | 713/2 |
| 7,861,282 B2 * | 12/2010 | Kakigi | 726/1 |
| 7,984,511 B2 * | 7/2011 | Kocher et al. | 726/27 |
| 2007/0174896 A1 | 7/2007 | Furuya | |

FOREIGN PATENT DOCUMENTS

| | | |
|---|---|---|
| JP | 08-221558 A | 8/1996 |
| JP | 2001-266112 A | 9/2001 |
| JP | 3493522 B | 11/2003 |
| JP | 2007-199909 A | 8/2007 |

OTHER PUBLICATIONS

Japanese Office Action issued on Nov. 16, 2010 in the corresponding Japanese Patent Application No. 2008-296724.

* cited by examiner

*Primary Examiner* — Tom Y Lu
(74) *Attorney, Agent, or Firm* — Sughrue Mion, PLLC

(57) ABSTRACT

An information processing device includes: a storage that stores information associating features with respective processing information; an electronic image acquisition unit that acquires an electronic image obtained by reading an image of an original; a specifying unit that recognizes a feature contained in the acquired electronic image, and specifies the processing information associated with the recognized feature and stored in the storage as processing information for use in processing the acquired electronic image; and a display control unit that displays information indicating the specified processing information and a part of the image where the feature is recognized in the acquired electronic image.

18 Claims, 10 Drawing Sheets

1/5 PAGE

| PAGE NUMBER | RECOGNIZED POLICY NAME | EXTRACTED STAMP | CHANGE OF POLICY |
|---|---|---|---|
| 1 | TOP SECRET | TOP SECRET | — |
| 2 | TOP SECRET | TOP SECRET | — |
| 3 | TOP SECRET | TOP SECRET | — |
| 4 | TOP SECRET | COMPANY SECRET | COMPANY SECRET |
| 5 | TOP SECRET | TOP SECRET | — |

REGISTER AND TO THE NEXT PAGE    CANCEL

FIG. 6

| POLICY ID | POLICY NAME | PERMITTED USER | PERMITTED OPERATION | STAMP IMAGE DATA |
|---|---|---|---|---|
| 0001 | TOP SECRET | CREATOR | PERUSAL, PRINT, STORE | TOP SECRET |
| | | DEPARTMENT MANAGER | PERUSAL | |
| 0002 | COMPANY SECRET | CREATOR | PERUSAL, PRINT, STORE | COMPANY SECRET |
| | | DEPARTMENT MANAGER | PERUSAL, PRINT | |
| | | GENERAL MEMBER | PERUSAL | |
| ... | ... | ... | ... | ... |

FIG. 7

| DOCUMENT ID | POLICY ID | CREATOR ID | CREATION DATE AND TIME |
|---|---|---|---|
| 40ffaaa4-0fb6-4634-85bf-bba45bc941b5 | 0001 | User A | JULY 1, 2008 10:00 |
| 4FB6BB00-3347-11d0-B40A-00AA005FF586 | 0002 | User Z | AUGUST 12, 2008 10:00 |
| ... | ... | ... | ... |

FIG. 8

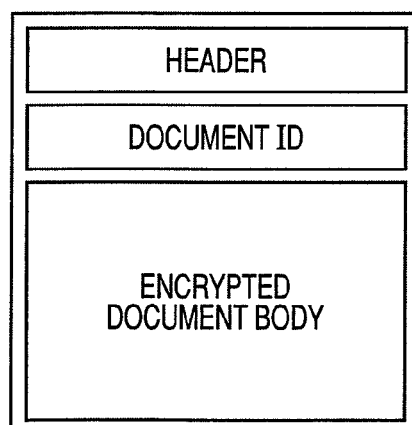

| | | | 1/5 PAGE |
|---|---|---|---|
| PAGE NUMBER | RECOGNIZED POLICY NAME | EXTRACTED STAMP | UNREGISTERED |
| 1 | TOP SECRET | TOP SECRET | ☐ |
| 2 | TOP SECRET | TOP SECRET | ☐ |
| 3 | TOP SECRET | TOP SECRET | ☐ |
| 4 | TOP SECRET | COMPANY SECRET | ☐ |
| 5 | TOP SECRET | TOP SECRET | ☐ |

REGISTER AND TO THE NEXT PAGE | CANCEL

FIG. 13

|  |  |  | 1/5 PAGE |
|---|---|---|---|
| PAGE NUMBER | STAMP OF RECOGNIZED POLICY | EXTRACTED STAMP | UNREGISTERED |
| 1 | TOP SECRET | TOP SECRET | ☐ |
| 2 | TOP SECRET | TOP SECRET | ☐ |
| 3 | TOP SECRET | TOP SECRET | ☐ |
| 4 | TOP SECRET | COMPANY SECRET | ☐ |
| 5 | TOP SECRET | TOP SECRET | ☐ |

REGISTER AND TO THE NEXT PAGE | CANCEL

FIG. 14

|  |  |  | 1/5 PAGE |
|---|---|---|---|
| PAGE NUMBER | RECOGNIZED POLICY NAME | EXTRACTED STAMP | CHANGE OF POLICY |
| 1 | TOP SECRET | TOP SECRET | — |
| 2 | TOP SECRET | TOP SECRET | — |
| 3 | TOP SECRET | TOP SECRET | — |
| 4 | TOP SECRET | COMPANY SECRET | COMPANY SECRET |
| 5 | TOP SECRET | TOP SECRET | — |

REGISTER AND TO THE NEXT PAGE | CANCEL

FIG. 15

| POLICY ID | POLICY NAME | PERMITTED USER | PERMITTED OPERATION | STAMP IMAGE DATA | | |
|---|---|---|---|---|---|---|
| 0001 | TOP SECRET | CREATOR | PERUSAL, PRINT, STORE | TOP SECRET | TOP SECRET | SECRET |
| | | DEPARTMENT MANAGER | PERUSAL | | | |
| 0002 | COMPANY SECRET | CREATOR | PERUSAL, PRINT, STORE | COMPANY SECRET | INTERNAL DOCUMENT | IMPORTANCE |
| | | DEPARTMENT MANAGER | PERUSAL, PRINT | | | |
| | | GENERAL MEMBER | PERUSAL | | | |
| ... | ... | ... | ... | ... | ... | ... |

FIG. 16

| PAGE NUMBER | RECOGNIZED POLICY NAME | RECOGNIZED POLICY STAMP | EXTRACTED STAMP | CHANGE OF POLICY |
|---|---|---|---|---|
| 1 | TOP SECRET | TOP SECRET | TOP SECRET | — |
| 2 | TOP SECRET | TOP SECRET | TOP SECRET | — |
| 3 | COMPANY SECRET | INTERNAL DOCUMENT | INTERNAL DOCUMENT | — |
| 4 | COMPANY SECRET | COMPANY SECRET | COMPANY SECRET | — |
| 5 | COMPANY SECRET | IMPORTANCE | SECRET | TOP SECRET |

REGISTER AND TO THE NEXT PAGE    CANCEL

1/5 PAGE

INFORMATION PROCESSING DEVICE, INFORMATION PROCESSING METHOD, AND COMPUTER READABLE MEDIUM

CROSS-REFERENCE TO RELATED APPLICATIONS

This application is based on and claims priority under 35 U.S.C. 119 from Japanese Patent Application No. 2008-296724 filed Nov. 20, 2008.

BACKGROUND

Technical Field

The present invention relates to an information processing device, an information processing method, and a computer readable medium.

SUMMARY

According to a first aspect of the present invention, an information processing device includes: a storage that stores information associating features with respective processing information; an electronic image acquisition unit that acquires an electronic image obtained by reading an image of an original; a specifying unit that recognizes a feature contained in the acquired electronic image, and specifies the processing information associated with the recognized feature and stored in the storage as processing information for use in processing the acquired electronic image; and a display control unit that displays information indicating the specified processing information and a part of the image where the feature is recognized in the acquired electronic image.

BRIEF DESCRIPTION OF THE DRAWINGS

Exemplary embodiment of the present invention will be described in detail based on the following figures, wherein:

FIG. 6 is a view showing one example of storage contents of a policy DB;

FIG. 7 is a view showing one example of storage contents of a document information DB;

FIG. 8 is a view showing one example of the configuration of a protected electronic document;

FIG. 13 is a view showing another example of the specific result confirmation screen;

FIG. 14 is a view showing another example of the specific result confirmation screen;

FIG. 15 is a view showing another example of storage contents of the policy DB; and FIG. 16 is a view showing another example of the specific result confirmation screen.

DETAILED DESCRIPTION

The embodiments of the present invention will be described below with reference to the drawings.

Figure 1:
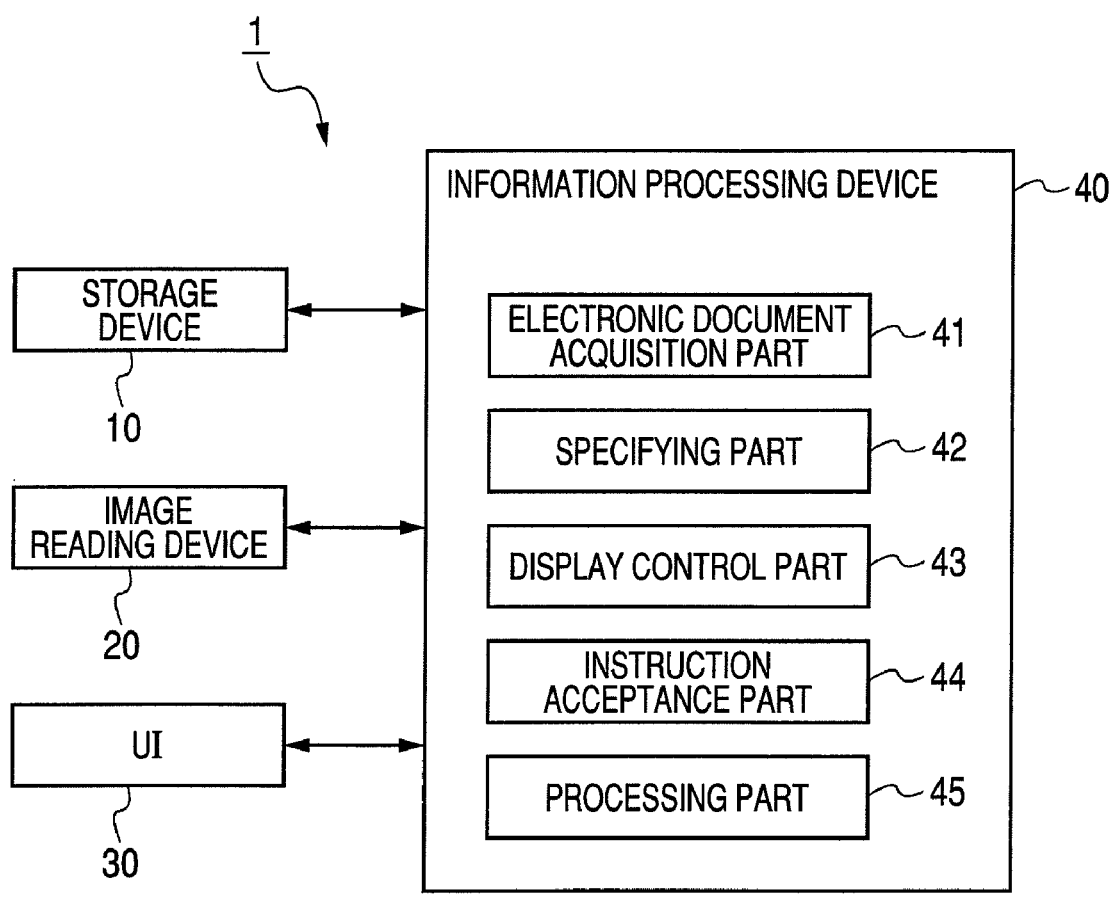
FIG. 1 is a block diagram showing one example of the configuration of an information processing system according to an embodiment.

FIG. 1 is a block diagram showing one example of the configuration of an information processing system 1 according to an embodiment. This information processing system 1 recognizes a feature from an electronic image obtained by reading an image of an original and processes the electronic image using the processing information corresponding to the feature.

In FIG. 1, the information processing system 1 has a storage device 10, an image reading device 20, a user interface 30, and an information processing device 40.

The storage device 10 stores information associating the feature contained in the electronic image and the processing information for use in processing the electronic image. The storage device 10 is realized by a hard disk drive, for example.

In one specific form, the storage device 10 stores information associating a mark image ("feature" in this form, for example, a stamp image) representing a security level and a security policy given to the electronic image. The security policy is information for controlling the use of the electronic image, or the "processing information" in this form. The above feature is not limited to the mark image, but may be a keyword, for example. Also, the above processing information is not limited to the security policy, but may be information (e.g., facsimile number or mail address) indicating the destination of the electronic image, information (e.g., path of a folder) indicating the storage location of the electronic image, or information (e.g., workflow definition information) indicating a procedure of the electronic image.

The image reading device 20 reads the image of the original to generate the electronic image. More specifically, the image reading device 20 is a scanner for optically reading the image of the original to generate the image data.

The above original is a recording medium such as paper on which the image is recorded to be optically readable (more specifically visible), and also called a paper document, for example. The above electronic image may be electronic data representing the image of the original, though its format is not particularly limited, and is also called an electronic document, for example.

The user interface (hereinafter referred to as a "UI") 30 has a function of displaying information to the user and a function of accepting an instruction from the user. The UI 30 is a liquid crystal display of the touch panel type, for example.

The information processing device 40 recognizes a feature from the electronic image obtained by reading the image of the original and processes the electronic image using the processing information corresponding to the feature.

The information processing device 40 is realized in cooperation of hardware resource and software in one form, and may be a computer, for example. More specifically, each function of the information processing device 40 is implemented by reading a program recorded on a recording medium into a main storage unit (main memory) and executing it on a central processing unit (CPU: Central Processing Unit). The above program is provided by being recorded on a computer readable recording medium such as CD-ROM, or distributed as a data signal in communication. The information processing device 40 may be realized by hardware only. Also, the information processing device 40 may be physically realized by one device, or a plurality of devices.

The information processing device 40 has an electronic image acquisition part 41, a specifying part 42, a display control part 43, an instruction acceptance part 44 and a processing part 45.

The electronic image acquisition part 41 acquires the electronic image obtained by reading the image of the original. For example, the electronic image acquisition part 41 acquires the electronic image representing the image of the original by reading the image of the original using the image reading device 20.

In the following explanation, the electronic image acquired by the electronic image acquisition part 41 is called an "object electronic image".

The specifying part 42 recognizes a feature contained in the object electronic image, and specifies the processing information associated with the recognized feature in the storage device 10 as the processing information for use in processing the object electronic image.

The specifying part 42 may recognize a mark image contained in the object electronic image through an image recognition process, or recognize a keyword included in the object electronic image through a character recognition process such as an OCR (Optical Character Recognition), for example.

In one specific form, the specifying part 42 extracts a feature from the object electronic image, collates the extracted feature and the feature stored in the storage device 10, specifies the feature corresponding to the extracted feature among the stored features, and specifies the processing information associated with the concerned feature as the processing information for use in processing the object electronic image. Herein, the feature corresponding to the extracted feature may be, for example, the feature matched with the extracted feature, or the feature similar to some extent to the extracted feature.

The process of the specifying part 42 is not limited to the above process. For example, the specifying part 42 may determine, for each feature stored in the storage device 10, whether or not the feature is contained in the object electronic document, and specify the processing information associated with the feature determined to be contained in the object electronic image as the processing information for use in processing the object electronic image.

The display control part 43 displays information indicating the processing information specified by the specifying part 42 and a part of the image in which the feature is recognized in the object electronic image. In an example of FIG. 1, the display control part 43 displays the above information on the UI 30.

The information indicating the processing information may be, for example, the name of processing information, an image representing the processing information, the processing information itself, or the feature (e.g., mark image or keyword) stored associated with the processing information.

The instruction acceptance part 44 accepts an instruction regarding the processing information from the user in accordance with a display by the display control part 43. In the example of FIG. 1, the instruction acceptance part 44 accepts the instruction from the user via the UI 30.

The processing part 45 processes the object electronic image, based on the instruction from the user accepted by the instruction acceptance part 44.

In one form, the instruction acceptance part 44 accepts an instruction as to whether or not the processing information specified by the specifying part 42 is applied to the object processing information. If the instruction of applying the processing information is accepted, the processing part 45 processes the object electronic image using the specified processing information. On the other hand, if the instruction of not applying the processing information is accepted, the processing part 45 does not apply the specified processing information to the object electronic image. In this case, the processing part 45 may not process the object electronic image, or process the object electronic image using predetermined other processing information. In one form of this embodiment, the display control part 43 displays a GUI (Graphical User interface) element (e.g., a check box) for indicating whether or not the specified processing information is applied to the object electronic image, and the instruction acceptance part 44 accepts an instruction from the user with the GUI element.

Also, in one form, the instruction acceptance part 44 accepts an instruction of changing the processing information for use in the object electronic image from the specified processing information, and the processing part 45 processes the object electronic image using the processing information after change. In this case, the instruction acceptance part 44 displays a list of processing information stored in the storage device 10, using the UI 30, and accepts an operation of selecting the processing information from the list, for example. In one form of this embodiment, the display control part 43 displays a GUI element (e.g., a drop down list) for selecting the processing information and the instruction acceptance part 44 accepts a selection instruction from the user with the GUI element.

In one specific form, a process for the object electronic image involves setting a specific security policy in the object electronic image. However, the process for the object electronic image may be the process (mail transmission or facsimile transmission) for transmitting the object electronic image to the specific destination, the process for storing the object electronic image at the specific storage location such as a folder in a document management system (DMS: Document Management System), or the process for performing one series of processes for the object electronic image in accordance with the specific workflow definition information.

Part or all of the storage device 10, the image reading device 20 and the UI 30 may be included in the information processing device 40.

Figure 2:
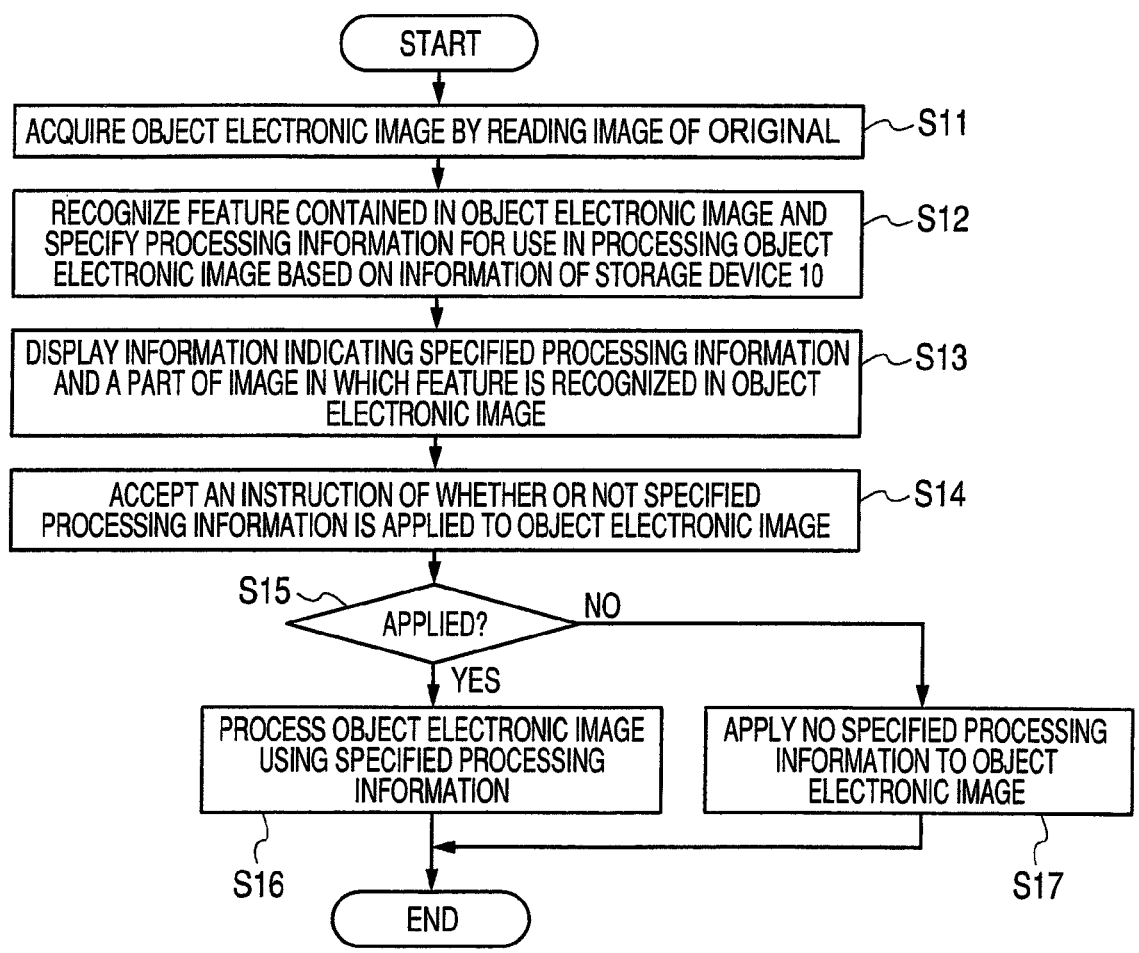
FIG. 2 is a flowchart showing a first operation example of an information processing device.

FIG. 2 is a flowchart showing a first operation example of the information processing device 40. Referring to FIG. 2, the first operation example of the information processing device 40 will be described below.

The information processing device 40 controls the image reading device 20 to read an image of an original set in the image reading device 20, and acquire an object electronic image represented by the image of the original (S11).

Then, the information processing device 40 recognizes a feature contained in the object electronic image, and specifies the processing information for use in processing the object electronic image, based on information of the storage device 10 (S12).

Then, the information processing device 40 displays a specific result confirmation screen including information indicating the specified processing information and the part of the image in which the above feature is recognized in the object electronic image on the UI 30 (S13). On the specific result confirmation screen, information indicating the processing information and a part of the image in which the feature is recognized are displayed correspondingly (e.g., side by side). The user compares the specified processing information and the part of the image in which the feature is recognized on the specific result confirmation screen by visual inspection, and checks whether or not there is an error in the specific result of the processing information.

Then, the information processing device 40 accepts an instruction as to whether or not the specified processing information is applied to the object electronic image as the instruction from the user on the specific result confirmation screen (S14). For example, the user gives an instruction of applying the specified processing information by an operation on the specific result confirmation screen if it is judged that the specific result is correct, or the user gives an instruction of not applying the specified processing information if it is judged that there is an error in the specific result.

The information processing device 40 judges whether or not there is an instruction from the user of applying the specified processing information (S15), and if it is judged that there is the instruction of applying the specified processing information (S15: YES), the object electronic image is processed using the specified processing information (S16). On the other hand, if it is judged that there is the instruction of not applying the specified processing information (S15: NO), the specified processing information is not applied to the object electronic image (S17). In this case, the information processing device 40 may not process the object electronic image, or process the object electronic image using predetermined other processing information.

Figure 3:
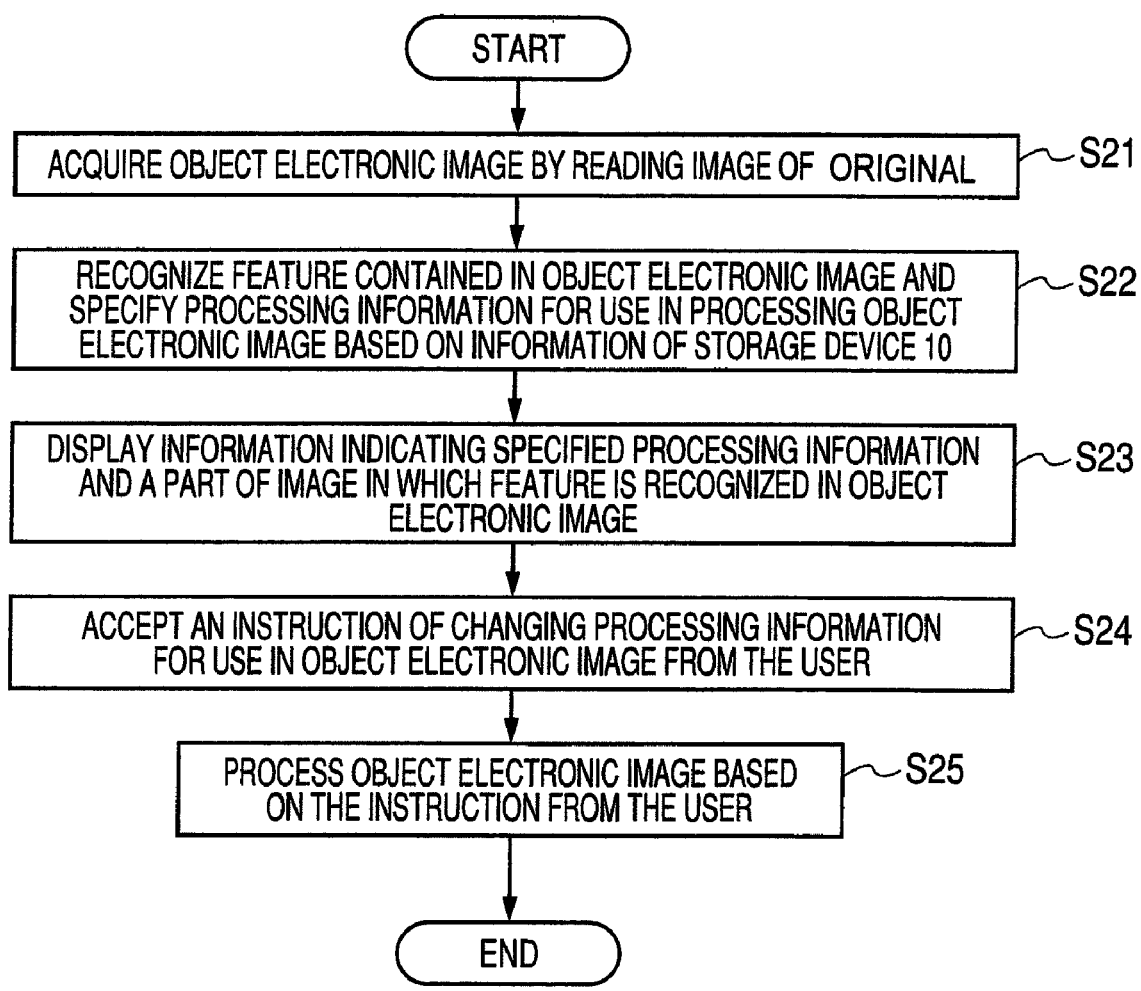
FIG. 3 is a flowchart showing a second operation example of the information processing device.

FIG. 3 is a flowchart showing a second operation example of the information processing device 40. Referring to FIG. 3, the second operation example of the information processing device 40 will be described below.

The information processing device 40 acquires an object electronic image representing an image of an original (S21), and recognizes a feature contained in the object electronic image, and specifies the processing information for use in processing the object electronic image (S22) in the same way as in the first operation example. And the information processing device 40 displays a specific result confirmation screen including information indicating the specified processing information and a part of the image in which the above feature is recognized in the object electronic image on the UI 30 (S23). The user checks whether or not there is an error in the specific result of the processing information on the specific result confirmation screen.

Then, the information processing device 40 accepts an instruction of changing the processing information for use in processing the object electronic information from the specified processing information as the instruction from the user on the specific result confirmation screen (S24). For example, the user gives an instruction of not changing the processing information by an operation on the specific result confirmation screen if it is judged that the specific result is correct, or the user gives an instruction of changing the processing information if it is judged that there is an error in the specific result. For example, the user displays a list of processing information on the specific result confirmation screen, and performs an operation of selecting the correct processing information from the list.

The information processing device 40 processes the object electronic image based on the instruction from the user (S25). More specifically, the information processing device 40 processes the object electronic image using the specified processing information if it receives the instruction of not changing the processing information, or processes the object electronic image using the processing information after change if it receives the instruction of changing the processing information.

A specific application example of the information processing device according to this embodiment will be described below in a case where the information processing device is applied to a document use control system.

Figure 4:
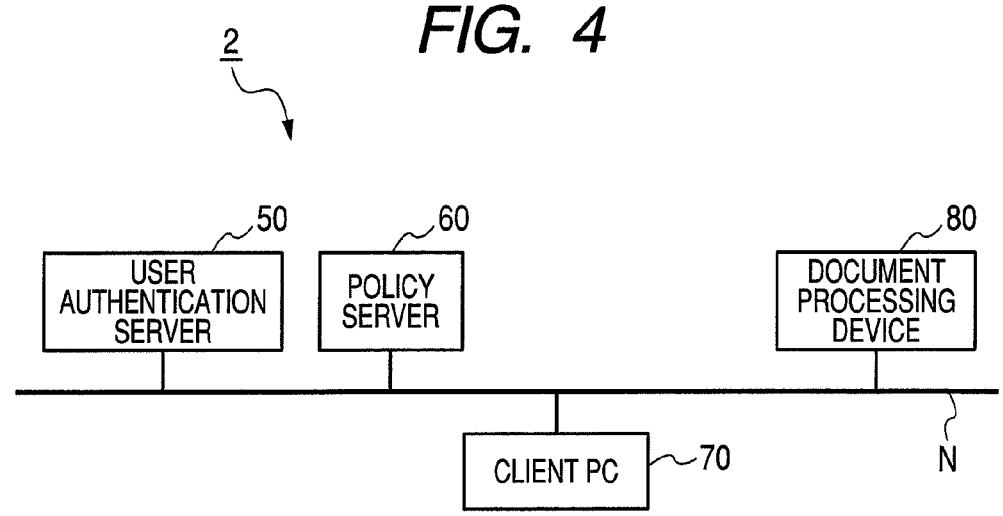
FIG. 4 is a schematic view showing one example of the configuration of a document use control system including the information processing device according to the embodiment.

FIG. 4 is a schematic view showing one example of the configuration of the document use control system 2 comprising the information processing device according to the embodiment. This document use control system 2 is the system for controlling the use of the electronic document using a security policy, and may be a DRM (Digital Rights Management) system, for example. In the following explanation, the security policy is called the "policy" and the user is called the "user".

In FIG. 4, the document use control system 2 has a user authentication server 50, a policy server 60, a client PC 70, and a document processing device 80. These devices are connected to a network N such as the internet or LAN (Local Area Network).

The user authentication server 50 makes the centralized management of the user authentication in the document use control system 2, and performs the user authentication in response to an inquiry from another device. The user authentication server 50 may be an LDAP (Lightweight Directory Access Protocol) server or an active directory server, for example.

The policy server 60 manages the right of access to the electronic document. More specifically, the policy server 60 controls the use of the electronic document using the policy by associating the electronic document to be protected and the policy for controlling the use of the electronic document.

The client PC 70 is the device for using the electronic document, and controls the use of the electronic document in cooperation with the policy server 60. For example, the client PC 70 communicates with the policy server 60 to permit the use (perusal, edit, print, etc.) of the electronic document within the range permitted by the policy associated with the electronic document.

The document processing device 80 has a scan function of scanning the paper document to obtain the electronic document, and an electronic document processing function of processing the obtained electronic document. More specifically, the document processing device 80 performs a process for scanning the paper document with a stamp affixed, recognizing the stamp from the electronic document obtained by scanning, specifying the policy corresponding to the stamp, and giving the policy to the electronic document. The document processing device 80 may be, for example, a multifunction printer (MFP: Multifunction Peripheral) having two or more functions of the scan function, print function, copy function and facsimile function.

The configuration and operation of the policy server 60, the client PC 70 and the document processing device 80 will be described below in detail.

Figure 5:
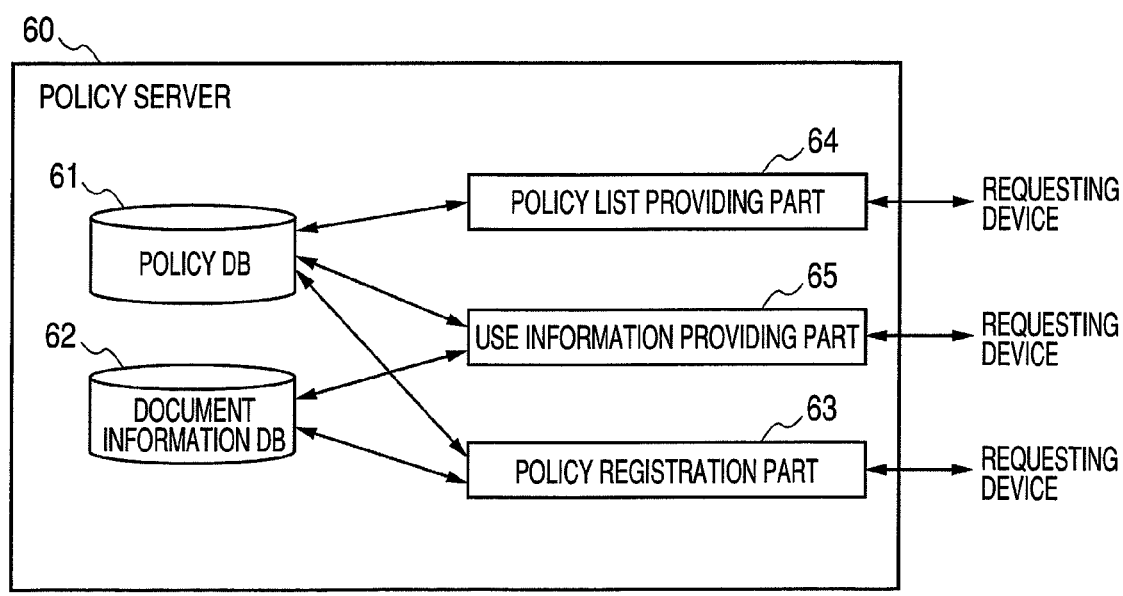
FIG. 5 is a block diagram showing the configuration of a policy server.

FIG. 5 is a block diagram showing the configuration of the policy server 60. In FIG. 5, the policy server 60 has a policy database (policy DB) 61, a document information database (document information DB) 62, a policy registration part 63, a policy list providing part 64, and a user information providing part 65.

The policy DB 61 is the database for managing the policy. The policy is information for controlling the use of the electronic document, for example, information describing the authorized person and the kind of use.

FIG. 6 is a view showing one example of storage contents of the policy DB 61. In FIG. 6, the policy DB 61 records, for each policy, a policy ID for identifying the policy, a name of the policy, information indicating the user or group for which the use of the electronic document is permitted, information indicating the operation permitted for the user or group, and the stamp image data representing the policy, which are associated.

The document information DB 62 is the database for managing the document information. The document information is information regarding the electronic document, including at least information associating the electronic document and the policy.

FIG. 7 is a view showing one example of storage contents of the document information DB 62. In FIG. 7, the document information DB 62 records, for each electronic document, a document ID for identifying the electronic document, a policy ID of the policy with which the electronic document accords, a user ID of the user who creates the electronic document, and the date and time of creating the electronic document, which are associated. Herein, the creation of the electronic document means an action of registering the association of the electronic document and the policy in the policy server 60. The document ID may be a UUID (Universal Unique IDentifier), for example.

The above data structure is only one example, but may be arbitrary as far as the policy applied to the electronic document can be defined for each electronic document.

The policy registration part 63, upon receiving a registration request for information indicating the association of the electronic information and the policy given to the electronic document from a requesting device such as the client PC 70 or document processing device 80, registers the information indicating the association in the document information DB 62. More specifically, the policy registration part 63, upon receiving a registration request including the document ID of the electronic document to be protected, the policy ID of the policy given to the electronic document and the user ID of the user (creator) who gives the policy to the electronic document, registers a new record including the document ID, the policy ID, the user ID, and the creation date and time in the document information DB 62. Herein, the creation date and time is based on the clock of the policy server 60 when the policy server 60 receives the registration request, for example.

The policy registration part 63 may check whether or not the document ID included in the registration request already exists in the document information DB 62, and if so, notify the requesting device of an error. If the UUID is used to generate the document ID without collision, this check is unnecessary.

In the following explanation, the electronic document associated with the policy registered in the policy server 60 in the above way, that is, the electronic document used under the control of the policy, is called a "protected electronic document". The protected electronic document is given the document ID of the electronic document by the requesting device, for example. FIG. 8 is a view showing one example of the configuration of the protected electronic document. In an example of FIG. 8, the protected electronic document includes a header indicating that the electronic document is the protected electronic document, a document ID of the electronic document, and an encrypted document body. Herein, the document body is encrypted by a key of cryptograph common to all the protected electronic documents. The document body may be encrypted by the key of cryptograph different for each protected electronic document, or may not be encrypted. Also, to prevent falsification of the document ID (e.g., replacement with another document ID), an electronic signature may be affixed on the entire protected electronic document, or the value of HMAC (Keyed-Hashing for Message Authentication code) may be given.

The policy list providing part 64, upon receiving a request for policy list from the requesting device such as the client PC 70 or the document processing device 80, provides a policy list registered in the policy DB 61 to the requesting device. For example, the requesting device makes an inquiry about the policy list to the policy list providing part 64 in giving the policy to the electronic document, and the policy list providing part 64 returns the policy list to the requesting device in response to the inquiry. In requesting the policy list, the requesting device may designate the user ID of the user who tries to give the policy. In this case, the policy list providing part 64 judges whether or not the designated user ID is included in a list of user ID for the predetermined user who is permitted to give the policy, and if so, provides the policy list, for example. Also, the policy list providing part 64 provides the list of policy permitted for the user identified by the designated user ID among the policies registered in the policy DB 61 by referring to information indicating the user permitted to give the policy and preset for each policy, for example.

The use information providing part 65, upon receiving a request for use information corresponding to the protected electronic document from the requesting device such as the client PC 70 or the document processing device 80, provides the use information for using the protected electronic document to the requesting device, based on the policy associated with the protected electronic document.

More specifically, the use information providing part 65, upon receiving a request including the document ID of the protected electronic document and the user ID of the user who tries to use the protected electronic document, retrieves a record of the document ID from the document information DB 62, and acquires the policy ID from the retrieved record. And the use information providing part 65 retrieves the policy identified by the policy ID from the policy DB 61, and judges whether or not the user identified by the user ID is permitted for use, based on the content of the retrieved policy. And if it is judged that the user is permitted, the use information indicating the operation permitted for the user is transmitted to the requesting device. On the other hand, if it is judged that the user is not permitted, information indicating that the use is not permitted is transmitted to the requesting device. The use information indicating the permitted operation may be called a license, for example.

Figure 9:
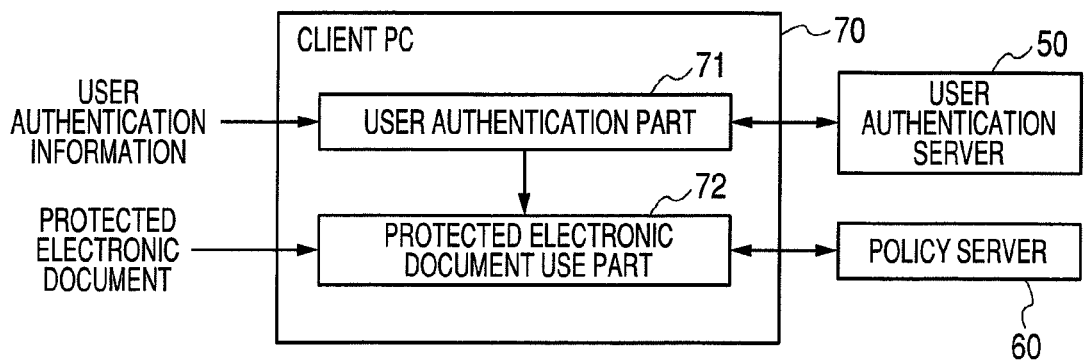
FIG. 9 is a block diagram showing the configuration of a client PC.

FIG. 9 is a block diagram showing the configuration of the client PC 70. In FIG. 9, the client PC 70 has a user authentication part 71 and a protected electronic document use part 72. The user authentication part 71 and the protected electronic document use part 72 are implemented by a document processing application, for example.

The user authentication part 71 accepts the user authentication information for authenticating the user from the user who tries to use the protected electronic document, and performs the authentication of the user in cooperation with the user authentication server 50, based on the user authentication information. The functions of the protected electronic document use part 72 as will be described later are provided only if the user authentication is successful.

The protected electronic document use part 72 transmits a request including the document ID of the protected electronic document of use target and the user ID of the user who tries to use it to the use information providing part 65 of the policy server 60, and receives a response from the use information providing part 65. And the protected electronic document use part 72, upon receiving the use information indicating the operation permitted for the user, permits the use of the protected electronic document within the permitted range of operation. The protected electronic document use part 72, upon receiving information indicating that the use is not permitted, does not permit the use of the protected electronic document, and performs an error process, for example.

The operation of the client PC 70 will be specifically described below.

If the user starts the document processing application by designating the protected electronic document, the client PC 70 (specifically the document processing application) performs the user authentication process. More specifically, the client PC 70 accepts the input of the user ID and password from the user, requests the user authentication server 50 to perform the user authentication based on the user ID and password, and receives the result of user authentication from the user authentication server 50. And if the user authentication is unsuccessful, the client PC 70 ends the process. On the other hand, if the user authentication is successful, the user authentication server reads the document ID from the designated protected electronic document, transmits a request including the document ID and the user ID to the policy server 60, and receives a response from the policy server 60.

The client PC 70, upon receiving information that the use is not permitted from the policy server 60, displays an error message "No right of access to the designated document" and ends the process.

On the other hand, the client PC 70, upon receiving the use information indicating the operation permitted for the user from the policy server 60, judges whether or not the "perusal" is permitted, and if not permitted, displays an error message "No right of perusal for the designated document" and ends the process.

On the other hand, if the "perusal" is permitted, the client PC 70 decodes the document body included in the protected electronic document by a predetermined decoding key, and displays the decoded document body to allow the user to peruse the protected electronic document.

Thereafter, the client PC 70, upon receiving a request for a specific operation of edit, store or print, judges whether or not the specific operation is permitted, based on the use information, and if permitted, permits the user to perform the specific operation. The client PC 70 may request the policy server 60 for the use information, every time of receiving the request for operation.

Figure 10:
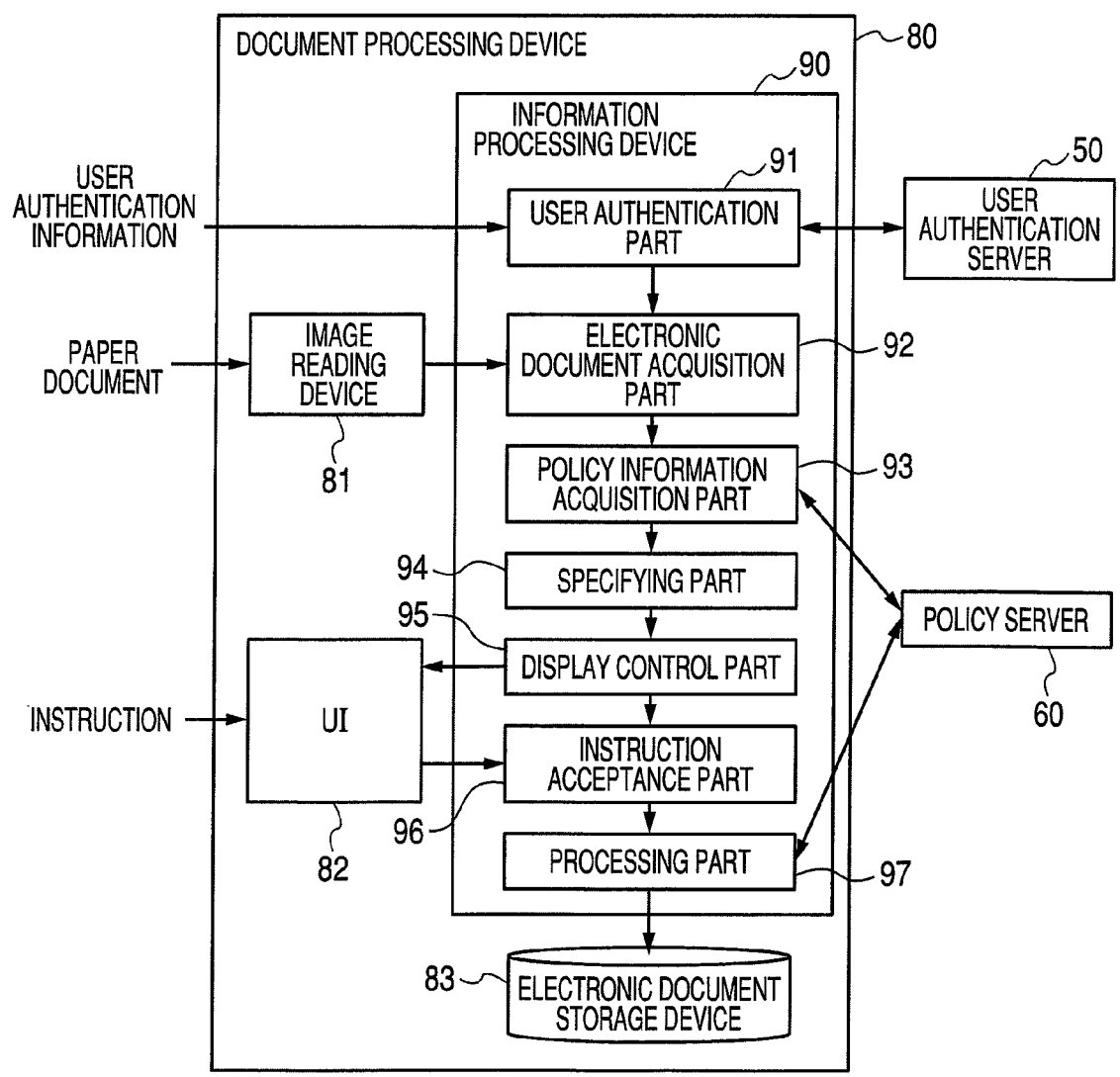
FIG. 10 is a block diagram showing the configuration of a document processing device.

FIG. 10 is a block diagram showing the configuration of the document processing device 80. In FIG. 10, the document processing device 80 has an image reading device 81, a UI 82, an electronic document storage device 83, and an information processing device 90.

The image reading device 81 optically reads an image of a paper document to generate an electronic document.

The UI 82 has a function of displaying information to the user and a function of accepting an instruction from the user, and may be a liquid crystal display of the touch panel type, for example.

The electronic document storage device 83 stores the electronic document, and may be a hard disk drive, for example.

The information processing device 90 processes the electronic document obtained by the image reading device 81, and may be a computer, for example.

The information processing device 90 has a user authentication part 91, an electronic document acquisition part 92, a policy information acquisition part 93, a specifying part 94, a display control part 95, an instruction acceptance part 96 and a processing part 97. These are implemented by a scan protection application, for example.

The user authentication part 91 accepts the user authentication information for authenticating the user from the user who tries to use the functions of the information processing device 90, and performs the authentication of the user in cooperation with the user authentication server 50, based on the user authentication information. The functions of the information processing device 90 as will be described later are provided if the user authentication is successful.

The electronic document acquisition part 92 reads the image of the paper document using the image reading device 81, and acquires the electronic document. In the following explanation, the electronic document acquired by the electronic document acquisition part 92 is called an "object electronic document".

The policy information acquisition part 93 transmits a request for policy list to the policy server 60, and acquires a policy list from the policy server 60. This policy list includes, for each policy, information including a policy ID, a name of policy and a stamp image which are associated.

The specifying part 94 recognizes the stamp image contained in the object electronic image, and specifies the policy associated with the stamp image recognized in the policy list as the policy applied to the object electronic image.

The display control part 95 displays the name of policy specified by the specifying part 94 associated with a part of the image in which the stamp image is recognized in the object electronic image on the UI 82.

The instruction acceptance part 96 accepts an instruction as to whether or not the specified policy is applied to the object electronic document through the UI 82, as the instruction from the user in accordance with a display by the display control part 95.

The processing part 97, upon accepting an instruction that the specified policy is applied to the object electronic document, performs a process for generating the document ID of the object electronic document, a process for registering the document ID and the policy ID of the specified policy associated in the policy server 60, a process for generating the protected electronic document by giving the document ID to the object electronic document, and a process for storing the protected electronic document in the electronic document storage device 83.

The operation of the information processing device 90 will be specifically described below.

Figures 11, 12:
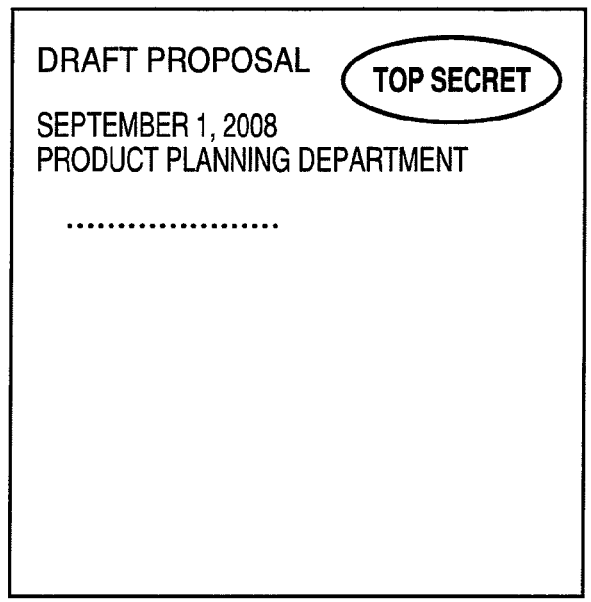
FIG. 11 is a view showing one example of a paper document.
FIG. 12 is a view showing one example of a specific result confirmation screen.

The user sets the paper document of plural pages with the stamp affixed on each page in the image reading device 81, and starts the scan protection application. In FIG. 11, one example of the paper document is illustrated. The stamp indicating the policy is affixed on the paper document, as shown in FIG. 11. In an example of FIG. 11, the stamp "top secret" is affixed.

If the scan protection application is started, the information processing device 90 (specifically the scan protection application) performs a user authentication process. More specifically, the information processing device 90 accepts the input of the user ID and password from the user, requests the user authentication server 50 to perform the user authentication based on the user ID and password, and receives the result of user authentication from the user authentication server 50.

And if the user authentication is unsuccessful, the information processing device 90 ends the process. On the other hand, if the user authentication is successful, the user authentication server scans the paper document of plural pages, using the image reading device 81, to obtain a plurality of electronic documents. Herein, it is supposed that the electronic document is obtained for each page of the paper document.

Then, the information processing device 90 requests the policy server 60 for the policy list, and acquires the policy list from the policy server 60.

Then, the information processing device 90 extracts, for each acquired electronic document (object electronic document), the stamp image from the object electronic document, collates the extracted stamp image and the stamp image included in the acquired policy list, specifies the stamp image included in the policy list that is matched with the extracted stamp image, and specifies the policy associated with the specified stamp image as the policy applied to the object electronic document.

And the information processing device 90 displays a specific result confirmation screen on the UI 82, as shown in FIG. 12. For each page of the paper document, the page number of the page, the name of the policy specified for the page, a part of the image from which the stamp image is extracted from the page, and a check box indicating whether or not the electronic document of the page is registered are displayed side by side on the specific result confirmation screen of FIG. 12. Also, a "register and advance to the next page" button is displayed on the specific result confirmation screen if the screen is not the final page, or a "completion" button (not shown) is displayed if the screen is the final page. Also, a "cancel" button is displayed on the specific result confirmation screen.

The user presses the "register and advance to the next page" button to display the next page, if judging that the specific result is correct, seeing the specific result confirmation screen. At the final page, the user presses the "completion" button, if judging that the specific result is correct. If judging that the specific result is false, the user presses the "cancel" button to cancel all the process, or turns on the check box of the page at which the specific result is false and presses the "register and advance to the next page" button or "completion" button.

If the "completion" button is pressed, the information processing device 90 generates the document ID for the object electronic document of each page, except for the page at which the check box is turned on.

And the information processing device 90 registers, for the object electronic document of each page, except for the page at which the check box is turned on, the document ID of the object electronic document, the policy ID of the policy specified for the object electronic document and the user ID which are associated in the policy server 60.

Then, the information processing device 90 gives the document ID to the object electronic document, encrypts the document body of the object electronic document, generates the protected electronic document and stores it in the electronic document storage device 83 for the object electronic document of each page, except for the page at which the check box is turned on.

The user gains access to the document processing device 80 from the client PC 70 or the like, and takes out the protected electronic document from the electronic document storage device 83.

For the object electronic document of the page at which the check box is turned on, a registration process with the policy server 60 and a storage process into the electronic document storage device 83 are not performed. For these pages, the user may perform the above process again, or protect the object electronic document by a different method than the above process.

FIG. 13 shows another example of the specific result confirmation screen. Though the name of the specified policy is displayed in FIG. 12, the stamp image associated with the specified policy is instead displayed in the example of FIG. 13.

Though the information processing device 90 accepts the instruction as to whether or not the specified policy is applied to the object electronic document in the above embodiment, it may instead accept the instruction of selecting the policy applied to the object electronic document. For example, the information processing device 90 may display a specific result confirmation screen as shown in FIG. 14. On the specific result confirmation screen of FIG. 14, the correct policy can be selected from a drop down list, instead of the check box for selecting the document that is not registered. In such a form, the information processing device 90 gives the specified policy to the object electronic document for the page at which there is no instruction of selecting the policy, or gives the selected policy to the object electronic document for the page at which there is the instruction of selecting the policy.

Though one stamp image is allocated to one policy as shown in FIG. 6 in the above embodiment, it will be appreciated that a plurality of stamp images may be allocated to one policy as shown in FIG. 15. FIG. 16 shows another example of the specific result confirmation screen in which the information as shown in FIG. 15 is stored in the policy DB 61. For each page of the paper document, the page number of the page, the name of the policy specified for the page, the stamp image associated with the policy specified for the page, and a part of the image from which the stamp image is extracted from the page are displayed side by side on the specific result confirmation screen of FIG. 16. The user checks whether or not two stamp images are coincident, seeing the specific result confirmation screen, and checks whether or not the specific result of the policy is correct. Further, in the example of FIG. 16, the specific result confirmation screen includes the drop down list for selecting the policy, so that the correct policy can be selected if the specific result is not correct.

Also, though the policy server 60 manages the relationship between the policy and the stamp image in the above embodiment, it will be appreciated that the document processing device 80 or other devices may manage the relationship.

The invention is not limited to the above embodiment, but may be changed in various ways without departing from the spirit or scope of the invention.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An information processing device comprising:
   a storage that stores information associating features with respective security policies;
   an electronic image acquisition unit that acquires an electronic image obtained by reading an image of an original;

a specifying unit that recognizes a feature contained in the acquired electronic image, and specifies a security policy associated with one of the stored information associating features; and a display control unit that displays information indicating the specified security policy and the recognized feature contained in the acquired electronic image, wherein the information processing device accepts an instruction to apply the specified policy to an electronic document when one of the stored information associating features matches the recognized feature contained in the acquired electronic image, and wherein the information processing device accepts an instruction to select one of the stored security policies when one of the stored information associating features is different than the recognized feature contained in the acquired electronic document.

2. The information processing device as claimed in claim 1, further comprising:

an instruction acceptance unit that accepts the instruction regarding the specified security policy after the display control unit displays the information indicating the specified security policy and the recognized feature contained in the acquired electronic image; and a processing unit that processes the acquired electronic image based on the accepted instruction.

3. The information processing device as claimed in claim 2, wherein the instruction acceptance unit accepts the instruction as to whether or not the specified security policy is applied to the acquired electronic image, and the processing unit processes the acquired electronic image using the specified security policy if the instruction of applying the specified processing information is accepted.

4. The information processing device as claimed in claim 2, wherein the instruction acceptance unit accepts the instruction of changing the specified security policy for use in processing the acquired electronic image from the stored security policies, and the processing unit processes the acquired electronic image using the specified security policy after change.

5. The information processing device as claimed in claim 1, wherein the acquired electronic image has a set policy.

6. An information processing method comprising:

storing information associating features with respective security policies;

acquiring an electronic image obtained by reading an image of an original;

recognizing a feature contained in the acquired electronic image, and specifying a security policy associated with one of the stored information associating features;

displaying information indicating the specified security policy and the recognized feature contained in the acquired electronic image;

accepting an instruction to apply the specified policy to an electronic document when one of the stored information associating features matches the recognized feature contained in the acquired electronic image; and accepting an instruction to select one of the stored security policies when one of the stored information associating features is different than the recognized feature contained in the acquired electronic document.

7. The information processing method as claimed in claim 6, wherein the acquired electronic image has a set policy.

8. A non-transitory computer readable medium storing a program causing a computer to execute a process for performing information processing, the process comprising:

storing information associating features with respective security policies;

acquiring an electronic image obtained by reading an image of an original;

recognizing a feature contained in the acquired electronic image, and specifying a security policy associated with one of the stored information associating features;

displaying information indicating the specified security policy and the recognized feature contained in the acquired electronic image;

accepting an instruction to apply the specified security policy to an electronic document when one of the stored information associating features matches the recognized feature contained in the acquired electronic image; and accepting an instruction to select one of the stored security policies when one of the stored information associating features is different than the recognized feature contained in the acquired electronic document.

9. The non-transitory computer readable medium as claimed in claim 8, wherein the acquired electronic image has a set policy.

10. The information processing device as claimed in claim 1, wherein the information processing device accepts an instruction to confirm that the displayed information indicating the specified security policy and the part of the image where the feature is recognized is correct.

11. The image processing device as claimed in claim 1, wherein the specifying unit recognizes the feature through an image recognition process.

12. A document processing system comprising:

an information processing device;

a policy server that associates each security policy of a plurality of security policies with at least one received user identification and at least one stamp image of a plurality of stamp images, wherein the information processing device comprises:

a storage that stores the plurality of stamp images and the plurality of security policies corresponding to their respective stamp image;

an electronic image acquisition unit that reads an original document having a plurality of pages, each page of the plurality of pages includes a stamp image, and the electronic image acquisition unit acquires electronic images corresponding to the plurality of pages of the original document;

a specifying unit that recognizes the stamp image included in the acquired electronic images, and specifies a document security policy corresponding to the stamp image;

a display control unit that displays a page number of the electronic images, the stamp image corresponds to each page number of the electronic images, the document security policy, and the stamp image corresponds to the document security policy.

13. The document processing system of claim 12, further comprising:

a user authentication server that receives the at least one user identification, and transmits the at least one user identification to the policy server.

14. The document processing system of claim 12, wherein the specifying unit recognizes the stamp image through an image recognition process.

15. The document processing system of claim 12, wherein the policy server comprises a policy list providing part that proves a list of policies permitted for the at least one user identification among a plurality of policies, and the policy list comprises a policy ID and the stored stamp images.

16. The document processing system of claim 12, wherein the information processing device further comprises a policy information acquiring unit that acquires the policy list from the policy server.

17. The document processing system as claimed in claim 16, wherein the information processing device further comprises a policy information acquiring unit that acquires the policy list from the policy server.

18. The document processing system as claimed in claim 16, wherein the specifying unit specifies the document security policy by collating the recognized stamp image and the stamp image included in the policy list.

* * * * *